(12) United States Patent
Bathey

(10) Patent No.: US 6,527,301 B1
(45) Date of Patent: Mar. 4, 2003

(54) HOSE THREAD PROTECTOR AND SPLASH GUARD

(75) Inventor: Richard A. Bathey, Mission Viejo, CA (US)

(73) Assignee: WenDan Enterprises, Inc., Mission Viejo, CA (US)

( * ) Notice: Subject to any disclaimer, the term of this patent is extended or adjusted under 35 U.S.C. 154(b) by 0 days.

(21) Appl. No.: 09/981,272

(22) Filed: Oct. 17, 2001

(51) Int. Cl.[7] ............................................... F16L 11/12
(52) U.S. Cl. ........................ 285/45; 285/115; 138/96 T; 138/96 R
(58) Field of Search .................... 285/45, 115, 242, 285/243, 23; 138/96 T, 96 R

(56) References Cited

U.S. PATENT DOCUMENTS

| | | | | |
|---|---|---|---|---|
| 1,812,794 A | * | 6/1931 | Lally | 138/96 R |
| 4,342,337 A | * | 8/1982 | Underwood | 138/96 T |
| 4,411,934 A | * | 10/1983 | Steinhagen | 138/96 T |
| 4,483,371 A | * | 11/1984 | Susin | 138/96 R |
| 4,805,933 A | * | 2/1989 | Swisher | 285/115 X |
| 5,309,585 A | * | 5/1994 | Hochschild, III | 138/110 |
| 5,857,711 A | * | 1/1999 | Comin-DuMong et al. | 285/115 X |
| 6,056,015 A | * | 5/2000 | Lewis | 138/96 R |

* cited by examiner

Primary Examiner—Lynne H. Browne
Assistant Examiner—David E. Bochna
(74) Attorney, Agent, or Firm—Stetina Brunda Garred & Brucker

(57) ABSTRACT

A cover for use with a hose having a hose body which transitions into a distal end portion including external threads. The cover comprises an engagement portion which is releaseably attachable to the end portion of the hose. Extending from the engagement portion is a shroud portion which is moveable between a shielded position and an exposed position. In the shielded position, the shroud portion extends substantially over and about the threads of the end portion of the hose, thus protecting the threads from abrasion. When in the exposed position, the shroud portion extends over and about a portion of the hose body, thus uncovering or exposing the external threads on the end portion of the hose.

18 Claims, 2 Drawing Sheets

HOSE THREAD PROTECTOR AND SPLASH GUARD

CROSS-REFERENCE TO RELATED APPLICATIONS (Not Applicable)

STATEMENT RE: FEDERALLY SPONSORED RESEARCH/DEVELOPMENT (Not Applicable)

BACKGROUND OF THE INVENTION

The present invention relates generally to protective devices, and more particularly to a hose thread protector and splash guard which is specifically adapted to protect or shield the external threads of a conventional hose (e.g., a garden hose) from abrasion, and to direct leaks or spray emanating from the joint between the hose and an attachment such as a nozzle away from a user.

It is a common practice for many homeowners, gardeners and construction workers to use a hose with no nozzle or other spray device attached to the distal end thereof. The preference not to use a nozzle is typically driven by the desire to maximize the outflow of water from the hose and to gain better control over the water flow via the placement of a thumb over the open distal end of the hose. In conventional hoses, the open distal end is defined by a metallic, externally threaded end portion of the hose which transitions into a hose body, itself fabricated from a flexible material.

One of the drawbacks associated with the practice of using a hose with no nozzle attached thereto is that the external, male threads on the end portion of the hose are susceptible to abrasion as the end portion is dragged over hard, rough surfaces such as concrete. Over time, the external, male threads will degrade to the point where a nozzle or other attachment is not maintainable in secure engagement thereto, and/or the joint between the end portion of the hose and the nozzle or other attachment will leak. Such degradation of the male threads typically necessitates the purchase of a new hose or, at the very least, a hose repair kit.

Further, even in those instances when the external threads of the hose are not degraded as a result of abrasion, the joint between the hose and the nozzle or other attachment frequently becomes a site of leakage or spray. More particularly, such leakage or spray often occurs as a result of the loss of the hose washer from the nozzle or other attachment. Such leakage or spray is typically directed toward the hose user.

In recognition of the foregoing, the present invention provides a cover which is specifically suited to protect the external hose threads from abrasion which would otherwise be caused by dragging the same across a roughened surface when a nozzle, sprinkler or other attachment is not coupled thereto. In those instances when such nozzle, sprinkler, or other attachment is threadably engaged to the hose threads, the cover of the present invention further provides the attributes of a splash guard by effectively shrouding or masking the joint defined therebetween. The structural and functional attributes of the cover constructed in accordance with the present invention and advantages attendant thereto will be discussed in more detail below.

BRIEF SUMMARY OF THE INVENTION

In accordance with the present invention, there is provided a cover for use with a hose (e.g., a garden hose) having a hose body which transitions into a distal end portion including external, male threads. The end portion of the hose, which is typically fabricated from a metallic material, defines a neck at the transition to the hose body which is itself fabricated from a flexible material. The cover comprises an engagement portion which is releaseably attachable to the end portion of the hose, and more particularly to the neck defined thereby. In this regard, the neck is of a first diameter, with the engagement portion having an annular configuration with an inner diameter less than the first diameter. The cover is fabricated from a flexible, resilient material so as to allow for the expansion of the engagement portion about the neck and frictional retention of the engagement portion thereon. The engagement portion of the cover may be formed to define an annular sealing edge which is engageable to the neck and has an edge diameter less than the inner diameter.

In addition to the engagement portion, the present cover comprises a shroud portion which is integral with and extends from the engagement portion. When the engagement portion is releaseably attached to the end portion of the hose, the shroud portion is moveable between a shielded position whereat it extends substantially over and about the external male threads of the end portion, and an exposed position whereat it extends over and about a portion of the hose body. The movement of the shroud portion to its exposed position fully uncovers or exposes the external threads of the end portion of the hose.

In the present cover, the shroud portion has an outwardly flared, conoidal configuration, and defines an annular rim having an outer diameter exceeding the inner diameter of the engagement portion. In this regard, the shroud and engagement portions collectively define a continuous, conoidal inner surface of increasing diameter from the edge of the engagement portion to the rim of the shroud portion. Additionally, the cover is formed such that the engagement portion has a mean cross-sectional thickness exceeding that of the shroud portion.

When the shroud portion of the cover is in its shielded position, the external hose threads are protected from abrasion as could be caused by dragging the same across a roughened surface such as concrete when a nozzle, sprinkler or other attachment is not threadably engaged to the end portion. The movement of the shroud portion to its exposed position allows such nozzle, sprinkler, or other attachment to be threadably connected to the end portion of the hose. Subsequent to such connection, the shroud portion may be moved back to its shielded position which causes the same to effectively cover or mask the joint defined between the nozzle, sprinkler, or other attachment and the hose. Thus, the hose user is protected from any leakage or spray which may occur at the joint between the hose and the nozzle, sprinkler, or other attachment. Thus, it is contemplated that the cover of the present invention will be maintained upon the hose at all times.

The size and configuration of the present cover is such that a hose user's thumb or finger may be easily placed over the open, outflow end of the hose to direct water flow when no nozzle is attached to the end portion. In this regard, it is preferred that the shroud portion be sized so as not to protrude beyond the outermost end of the end portion. The installation of the cover upon the hose is simple, and does not require the use of any tools. Additionally, the cover is formed to be devoid of any sharp edges or potentially hazardous features.

A preferred flexible, resilient material for the cover is one which is resistant to ultraviolet light, and is nontoxic due to the tendency of people to drink from hoses. Additionally, the material should possess abrasion resistance characteristics so as not to be too rapidly degraded when dragged across an abrasive surface. One currently preferred material is provided under the trademark Sarlink, with another possible material being provided under the trademark Santoprene, the latter having a hardness of forty-five durometer.

BRIEF DESCRIPTION OF THE DRAWINGS

These as well as other features of the present invention will become more apparent upon reference to the drawings wherein.

DETAILED DESCRIPTION OF THE INVENTION

Figure 1:
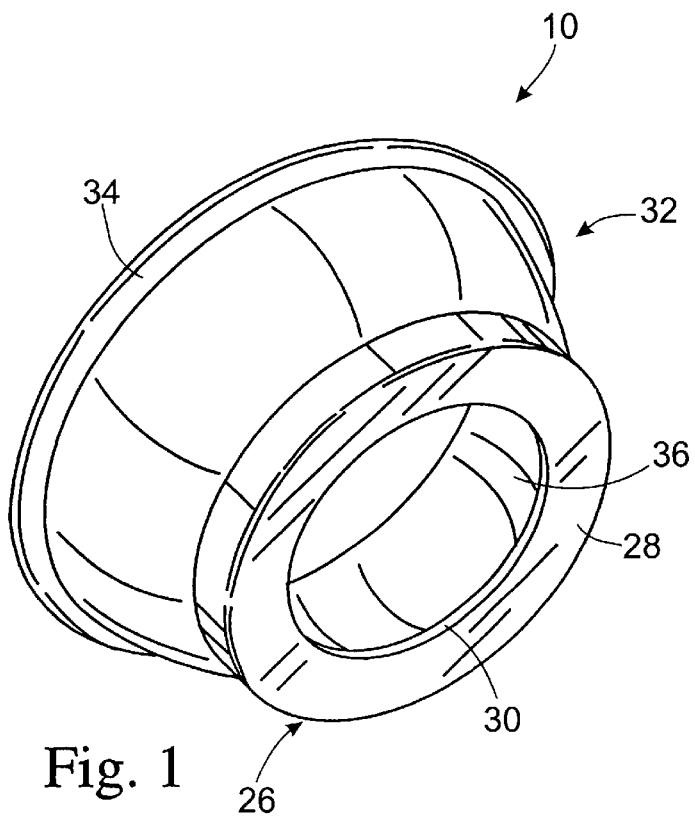
FIG. 1 is a perspective view of the cover of the present invention.

Referring now to the drawings wherein the showings are for purposes of illustrating a preferred embodiment of the present invention only, and not for purposes of limiting the same, FIG. 1 perspectively illustrates a cover 10 constructed in accordance with the present invention.

Figure 4:
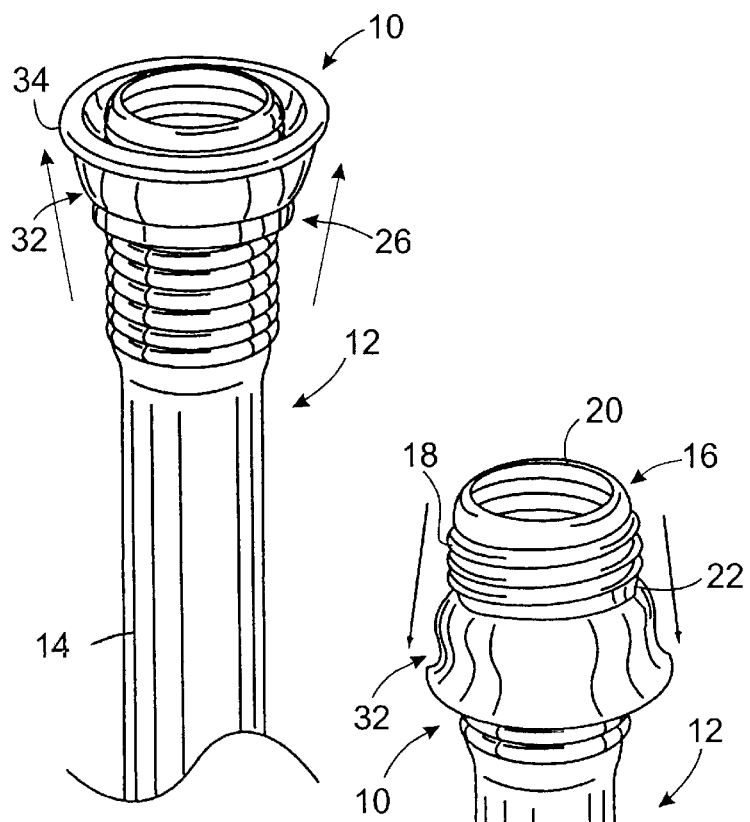
FIG. 4 is a partial perspective view of a hose including the present cover thereon in its shielded position.
Figure 5:
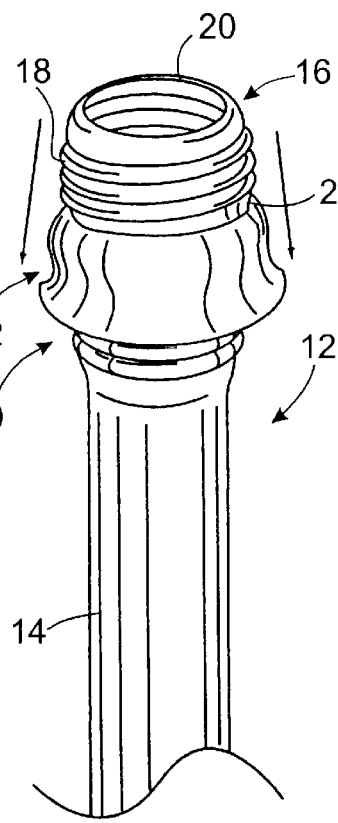
FIG. 5 is a partial perspective view similar to FIG. 4 illustrating a hose with the present cover thereon in its exposed position.
Figure 6:
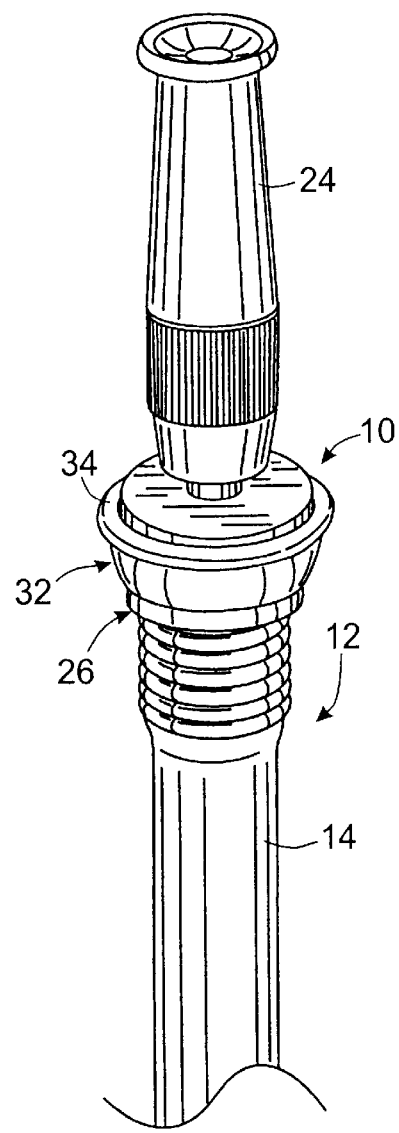
FIG. 6 is a partial perspective view of a hose including a nozzle and the cover engaged thereto, with the cover being shown in its shielded position for use as a splash guard.

As shown in FIGS. 4–6, the cover 10 is specifically adapted for use with a hose 12 (e.g., a garden hose) having a hose body 14 which transitions into a distal end portion 16. The end portion 16 is typically fabricated from a metallic material, and includes external, male threads 18 formed thereon. The end portion 16 further defines a distal rim 20 and a neck 22 which is located between the hose body 14 and threads 18. The hose body 14 is itself typically fabricated from a flexible material.

As seen in FIG. 6, the end portion 16 of the hose 12 is adapted to have an attachment, such as a nozzle 24, threadably connected thereto. Though the nozzle 24 is shown in FIG. 6, other attachments such as sprinklers are also threadably engageable to the end portion 16 of the hose 12. As indicated above, when the nozzle 24 or other attachment is not threadably connected to the end portion 16, the male threads 18 are susceptible to abrasion when the end portion 16 is dragged over hard, rough surfaces such as concrete.

Figure 2:
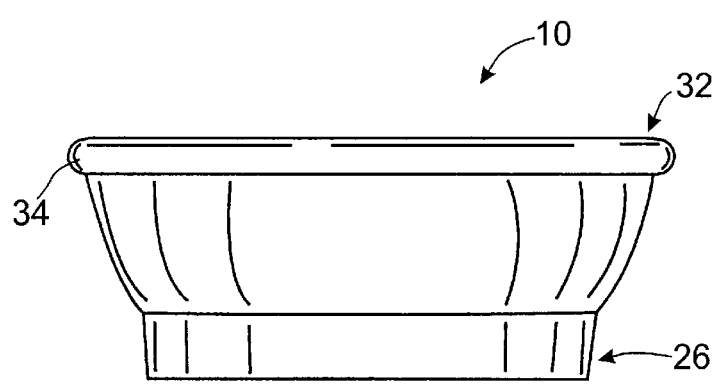
FIG. 2 is a side-elevational view of the cover shown in FIG. 1.
Figure 3:
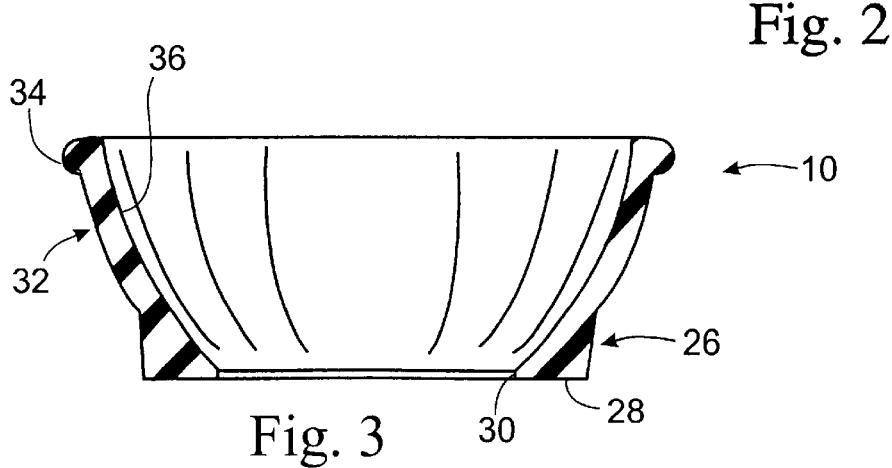
FIG. 3 is a cross-sectional view of the cover shown in FIG. 1.

Referring now to FIGS. 1–3, the cover 10 comprises an engagement portion 26 which is releasably attachable to the end portion 16 of the hose 12, and more particularly to the neck 22 defined thereby. The engagement portion 26 has an annular configuration with an inner diameter at the outer surface 28 thereof which is less than the diameter of the neck 22. As best seen in FIGS. 1 and 3, the engagement portion is preferably formed to define an annular sealing edge 30 having an edge diameter which is less than the diameter of the engagement portion 26 at the outer surface 28 thereof. As will be recognized, the cover 10 is fabricated from a flexible, resilient material so as to allow for the expansion of the engagement portion 26 about the neck 22 and frictional retention of the engagement portion 26 to the neck 22.

In addition to the engagement portion 26, the cover 10 of the present invention comprises a shroud portion 32 which is integral with and extends from the engagement portion 26. The shroud portion 32 has an outwardly flared, conoidal configuration, and defines an annular rim 34 having an outer diameter which exceeds the inner diameter of the engagement portion 26 at the outer surface 28 thereof. In this regard, the shroud and engagement portions 32, 26 collectively define a continuous, conoidal inner surface 36 of increasing diameter from the edge 30 of the engagement portion 26 to the rim 34 of the shroud portion 32. As best seen in FIG. 3, the cover 10 is formed such that the engagement portion 26 has a mean cross-sectional thickness exceeding that of the shroud portion 32.

Referring again to FIGS. 4–6, when the engagement portion 26 of the cover 10 is releasably attached to the end portion 16 of the hose 12, the shroud portion 32 is selectively movable between a shielded position (shown in FIG. 4) whereat it extends substantially over and about the male threads 18 of the end portion 16, and an exposed position (shown in FIG. 5) whereat it extends over and about a portion of the hose body 14 and/or a section of the end portion 16 which extends between the neck 22 and the hose body 14. As seen in FIG. 5, the movement of the shroud portion 32 to its exposed position fully uncovers or exposes the threads 18 of the end portion 16.

As indicated above, when the shroud portion 32 is in its shielded position, the threads 18 are protected from abrasion as could be caused by dragging the same over a roughened surface when the nozzle 24 or other attachment is not threadably engaged to the end portion 16. The movement of the shroud portion 32 to its exposed position allows the nozzle 24 or other attachment to be threadably connected to the end portion 16. When moved to its exposed position, the shroud portion 32 is folded over the engagement portion 26, thus allowing for the threadable connection of the nozzle 24 or other attachment to the end portion 16 without removing the cover 10 from the hose 12. As seen in FIG. 6, subsequent to such connection, the shroud portion 32 may be moved back to its shielded position which causes the is same to effectively cover the joint defined between the nozzle 24 or other attachment and the hose 12. Thus, the hose user is protected from any leakage or spray which may occur at the joint between the hose 12 and the nozzle 24 or other attachment.

As is most apparent from FIG. 4, the size and configuration of the cover 10 is such that a hose user's thumb or finger may be easily placed over the open, outflow end of the hose 12 defined by the rim 20 thereof to direct water flow when the nozzle 24 is not attached to the end portion 16. In this regard, it is preferred that the shroud portion 32 be sized so as not to protrude beyond the rim 20. As also indicated above, the installation of the cover 10 upon the hose 12 does not require the use of any tools. The cover 10 is further formed to be devoid of any sharp edges or potentially hazardous features. A preferred flexible, resilient material for the cover 10 is one which is resistant to ultraviolet light, and is nontoxic due to the tendency of people to drink from hoses. Such material should further possess abrasion resistance characteristics so as to not be too rapidly degraded when dragged across an abrasive surface. One currently preferred material is provided under the trademark Sarlink. Another possible material is provided under the trademark Santoprene and has a hardness of forty-five durometer.

Additional modifications and improvements of the present invention may also be apparent to those of ordinary skill in the art. Thus, the particular combination of parts described and illustrated herein is intended to represent only one embodiment of the present invention, and is not intended to serve as a limitation of alternative devices within the spirit and scope of the invention.

What is claimed is:

1. A cover for use with a hose having a hose body which transitions into a distal end portion including external threads, the cover comprising:

an engagement portion releaseably attachable to the end portion of the hose; and a shroud portion extending from the engagement portion and moveable between a shielded position whereat the shroud portion is extensible substantially over and about the threads of the end portion, and an exposed position whereat the shroud portion is extensible over and about a portion of the hose body;

wherein the cover is fabricated from a flexible, resilient material.

2. The cover of claim 1 wherein the end portion of the hose defines a neck at the transition to the hose body, and the engagement portion of the cover is sized and configured to be releaseably attachable to the neck.

3. The cover of claim 1 wherein the shroud portion has an inner surface that is outwardly flared and conoidally configured.

4. The cover of claim 3 wherein the engagement portion is formed to have a mean cross-sectional thickness which exceeds a mean cross-sectional thickness of the shroud portion.

5. A cover for use with a hose having a hose body which transitions into a distal end portion including external threads, the end portion of the hose defining a neck of a first diameter at the transition to the hose body, the cover comprising:

an engagement portion releaseably attachable to the neck and having an annular configuration with an inner diameter less than the first diameter, the cover being fabricated from a resilient material which allows for the expansion of the engagement portion about the neck and frictional retention of the engagement portion thereon; and a shroud portion extending from the engagement portion and moveable between a shielded position whereat the shroud portion is extensible substantially over and about the threads of the end portion, and an exposed position whereat the shroud portion is extensible over and about a portion of the hose body.

6. The cover of claim 5 wherein the engagement portion defines an annular edge which is engageable to the neck and has an edge diameter which is less than the inner diameter.

7. The cover of claim 6 wherein the shroud portion defines an annular rim having an outer diameter exceeding the inner diameter of the engagement portion.

8. The cover of claim 7 wherein the shroud and engagement portions collectively define a continuous, conoidal inner surface of increasing diameter from the edge to the rim.

9. A cover for use with a hose having a hose body which transitions into a distal end portion including external threads, the cover comprising:

an engagement portion releaseably attachable to the hose to allow for the selective detachment of the cover from the hose; and a shroud portion extending from the engagement portion and moveable between a shielded position whereat the shroud portion is extensible substantially over and about the threads of the end portion, and an exposed position whereat the shroud portion is extensible over and about a portion of the hose body; wherein the shroud portion is extensible substantially over and about a portion of an attachment which is releaseably engageable to the threads when the attachment is engaged to the threads.

10. The cover of claim 9 wherein the shroud portion defines an inner surface that is outwardly flared.

11. The cover of claim 10 wherein the inner surface has a spheroidal configuration.

12. The cover of claim 9 wherein the engagement portion of the cover is sized and configured to be releaseably attachable to the end portion of the hose.

13. The cover of claim 9 wherein the cover is fabricated from an abrasion resistant material.

14. The cover of claim 13 wherein the cover material is flexible and resilient.

15. The cover of claim 9 wherein the engagement portion defines an annular edge having an edge diameter, and the shroud portion defines an annular rim having an inner diameter greater than the edge diameter.

16. The cover of claim 15 wherein the edge diameter is less than a first diameter defined by the end portion of the hose at the transition to the hose body, and the cover is fabricated from a flexible, resilient material which allows for the expansion of the engagement portion about the neck and frictional retention of the engagement portion thereon.

17. The cover of claim 15 wherein the annular rim has a mean cross-sectional thickness which exceeds a mean cross-sectional thickness of the shroud portion.

18. The cover of claim 17 wherein the engagement portion is formed to have a mean cross-sectional thickness which exceeds a mean cross-sectional thickness of the shroud portion.

* * * * *